UNITED STATES PATENT OFFICE.

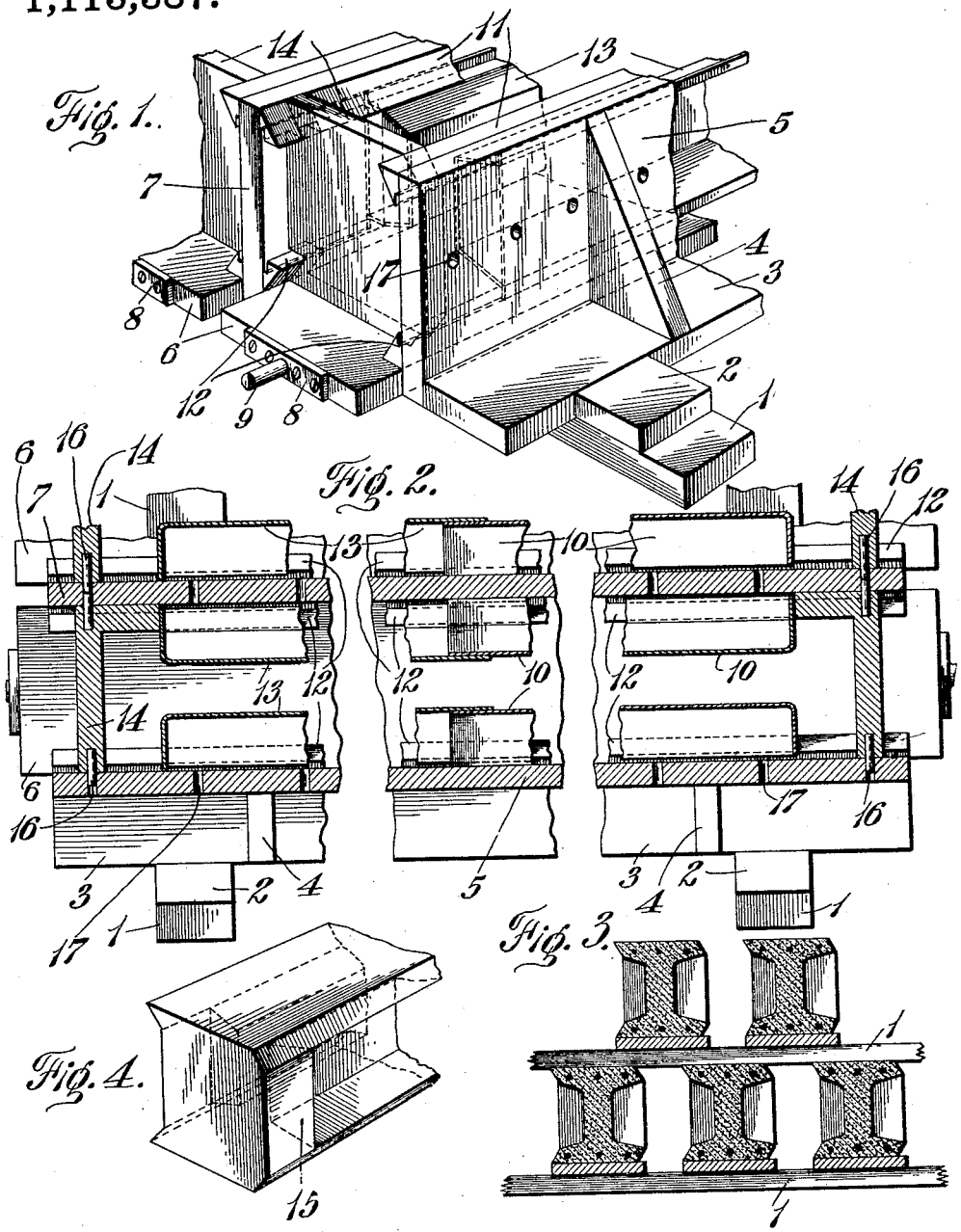

JAY W. VAUGHAN, OF DETROIT, MICHIGAN.

MOLD FOR CEMENT BEAMS.

1,113,387. Specification of Letters Patent. Patented Oct. 13, 1914.

Application filed August 9, 1911. Serial No. 643,193.

*To all whom it may concern:*

Be it known that I, JAY W. VAUGHAN, a citizen of the United States of America, residing at Detroit, in the county of Wayne and State of Michigan, have invented certain new and useful Improvements in Molds for Cement Beams, of which the following is a specification, reference being had therein to the accompanying drawings.

In forming beams of concrete or other cementitious material it is necessary, in order that the work be done economically, that the means by which the beams are molded be so arranged as to be available for making beams of different lengths. It is also necessary, in order to make the beams profitable, that the molds or system of molds by which they are formed be arranged so that the molds can be taken away from the beams before the latter are fully set, for use in forming other beams, and that the beams when uncovered by the molds be left in such a position as to dry out readily and be rapidly hardened so as to be ready for use without undue loss of time.

This invention relates to a mold system for forming beams for building purposes of cementitious material which are so arranged that the parts can be used for making beams of different lengths, and are so arranged that the parts of the system can be withdrawn before the beams are thoroughly set and be used in making other beams, the uncovered beams being arranged so as to dry thoroughly ready for use without further attention or the need of rehandling them during the drying out process.

The invention consists in the matters hereinafter set forth and more particularly pointed out in the appended claims.

In the drawings, Figure 1 is a view in perspective of a portion of a mold system that embodies features of the invention; Fig. 2 is a view in horizontal section through a portion of the mold system; Fig. 3 is a view partially in end elevation and partially in section showing the disposition of beams after they have been molded by the system and have been left in position for the drying out process; and Fig. 4 is a view in detail of the end portion of one form of beam which may be readily molded by this system.

As herein shown in preferred form, a series of bearing members or stringers 1 made of wood as herein indicated, or of metal of any preferred mill shape, are each provided at one end with a stop 2. A side strip 3 or clamp rests across the bearing members 1 against the stops 2 and has an upright brace 4 or the like, adapted to support a side member 5 that rests on edge on the bearing members 1 against the clamp 3. Pallets 6 are disposed in parallel spaced relation across the bearing members or stringers 1, the outer pallet abutting the side member 5 and the others acting as supports to hold intermediate walls or division members 7 in upright position. Suitable bearing plates 8 with gudgeons or pins 9 thereon are provided at each end of the pallets for attaching crane chain hooks or the like for manipulating the apparatus. The pallets, side walls and division members may be either of metal or of wood as desired.

Longitudinally extensible facings are mounted on the side walls and division members to form faces that give the proper form to the sides of beams molded between them. The system that is herein illustrated, is shown as designed for making I-beams whose upper and lower flanges have oppositely beveled margins. Accordingly the facings each consist of a stationary member 10, of sheet metal or the like secured to the side of a division member or companion side wall between an upper flange 11 and lower flange 12 adapted to give the desired dress to the margin of the produced beam. These flanges extend the entire length of the division members and side walls and form guides on which a second section 13 is longitudinally movable in telescopic engagement with the fixed section 10. End plates 14 are detachably secured between the division members and the side walls and have the desired dress on the inner side which produces the desired form of beam at the ends thereof. As herein indicated these end members are arranged to co-act with the ends of the sections 10 and 13 to form end cross flanges 15 between the flanges of the beams. Dowel pins 16 entering any of a series of apertures 17 in the side walls and division members make the end walls adjustable longitudinally along the pallets.

By moving the sections 13 of the facings in or out and correspondingly securing the end walls in position, the pallets, division members and side walls are available for forming beams of given cross section and any desired length within the limits of the structure.

In operation a series of bearing members or stringers are secured in spaced relation, the clamps and side members set in position, the pallets arranged in order with the interposed division members and the end walls and facings arranged to produce the desired length of the beam. The molds are then filled with the material with which the beam is constructed and the pallets then are slightly separated so as to permit the withdrawal of the side walls and division members. A second tier of stringers as indicated in Fig. 3, are then laid on the partially hardened beams which are sufficiently set to support the stringers, although not capable at this stage of being subjected to other handling. A second set of pallets, the withdrawn division members, side walls, and clamps with the end boards are then placed thereon in staggered relation to the lower set of beams and a second set of beams molded. This process is repeated and as a result a stack of beams is formed which are so disposed that the air passes freely around them and allows them to thoroughly season or dry out. The division members, side walls, clamps and end boards which constitute the most expensive portion of the molds are available for use, the stringers and pallets only being left in position until the beams are thoroughly set.

By this mold system beams are produced rapidly and economically and are so arranged as to require minimum floor space for storage during the drying out process. It is to be understood that the system is not restricted for use in making beams of the particular form herein indicated, but is available for molding columns or any parts of a building structure of any desired cross section and length.

Obviously, changes in the details of construction may be made without departing from the spirit of the invention and I do not care to limit myself to any particular form or arrangement of parts.

What I claim is:—

1. A mold system for beams comprising bearing members, pallets disposed transversely thereon, division members forming with the pallets a series of adjacent mold pockets, a facing member on the inner face of each division member comprising two extensible sections whereby the length of a facing dress may be varied and end walls adjustably securable between the division members to correspond to the adjusted length of the facing members.

2. A mold system for beams comprising stringers, stops at one end thereof, a clamp bearing against the stops, a side wall secured in upright position against the clamps or the stringers, pallets transversely disposed across the stringers one of which is contiguous to the side wall, division members each attached on the stringers between and by the pallets, extensible facing members on the proximate sides of the division members and side walls each having a section secured to the side wall and a section longitudinally shiftable on the side wall in telescopic engagement with the fixed section and end walls resting on the pallets between the division members and side walls longitudinally shiftable of the side walls in accordance with the adjusted length of the mold facings.

3. In a mold system for beams, a pallet, division members removably secured against the lateral margins thereof, a facing section on the inner face of each division member comprising a hollow plate having guide flanges longitudinally thereof against the side wall, and a movable section telescoping with the fixed section and moving in the guide flanges thereof, the exterior cross sectional contour of the facing sections providing the required facing dress to a molded beam, and end boards spanning the interval between the division members and longitudinally adjustable on the pallet whereby they may be moved into required relation to the adjusted facing plates.

In testimony whereof I affix my signature in presence of two witnesses.

JAY W. VAUGHAN.

Witnesses:
C. R. STICKNEY,
ANNA C. RAVILER.

Copies of this patent may be obtained for five cents each, by addressing the "Commissioner of Patents, Washington, D. C."